Feb. 17, 1970     D. SHARP     3,495,879
VEHICLE BRAKE SYSTEMS
Filed Sept. 19, 1967     4 Sheets-Sheet 1

INVENTOR.
DENIS SHARP

BY

AGENT

INVENTOR.
DENIS SHARP

Feb. 17, 1970    D. SHARP    3,495,879
VEHICLE BRAKE SYSTEMS
Filed Sept. 19, 1967    4 Sheets-Sheet 3

INVENTOR.
DENIS SHARP
BY
Frank R. Sifai
AGENT

United States Patent Office 3,495,879
Patented Feb. 17, 1970

3,495,879
VEHICLE BRAKE SYSTEMS
Denis Sharp, Crawley, England, assignor, by mesne assignments, to U.S. Philips Corporation, New York, N.Y., a corporation of Delaware
Filed Sept. 19, 1967, Ser. No. 668,819
Claims priority, application Great Britain, Sept. 19, 1966, 41,639/66
Int. Cl. B60t 8/02
U.S. Cl. 303—21                                    11 Claims

ABSTRACT OF THE DISCLOSURE

An apparatus to improve vehicle braking performance by releasing the vehicle brakes automatically if brake-lock or incipient brake-lock should occur. The apparatus includes a control piston located in fluid line interconnecting the master cylinder and the brake cylinder. A force balance mechanism and an external control force applicator are both connected to the control piston. When brake-lock occurs, the control piston is moved by the application of the external control force thereby severing fluid communication between the master cylinder and the brake cylinder. The pressurized fluid from the brake cylinder also acts on the control piston to minimize the magnitude of the external control force to be applied. Movement of the control piston expands the volume containing the fluid acting on the brake cylinder which causes a reduction in the fluid pressure therein and the force applied to the brakes thereby terminating brake-lock.

Figure 1:
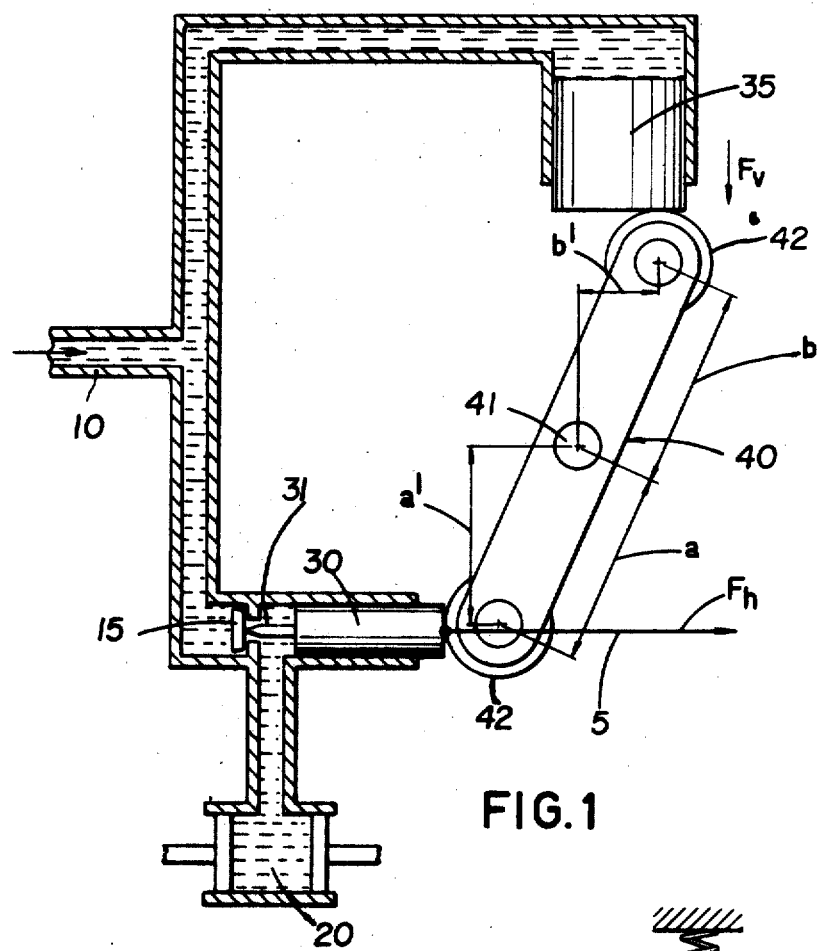

This invention relates to vehicle brake systems and is an improvement of the apparatus described U.S. Patent No. 3,389,939 to D. R. Skoyles.

Patent No. 3,389,939 describes various anti-lock brake systems, i.e. systems designed to improve braking performance by releasing a wheel brake automatically if the wheel tends to lock on a slippery surface and then permitting further braking action without the need for any change in the action of the person using the brake. Such systems can be successful in reducing the risk of skidding due to wheel lock and maintaining directional control and can also reduce braking distances.

The above-described prior anti-lock systems employ apparatus for use in an anti-lock hydraulic vehicle brake system for transferring stored mechanical energy from one storage element to another by application of an external control force to a transfer control piston of the apparatus. The first of said storage elements is constituted by the natural resilience of a brake assembly. The anti-lock apparatus comprises a control piston, a force-balancing device coupled to said control piston for causing forces associated with the energies stored in said storage elements to oppose each other. The control piston is hydraulically coupled to the brake assembly and adapted, during application of an anti-lock control force thereto, to tend to release said brake assembly, the second storage element is adapted to develop a force which is fed to the control piston via the force-balancing device in such manner as to oppose any force acting on the control piston due to hydraulic pressure.

The present invention provides an anti-lock apparatus for releasing vehicle brakes when brake-lock or incipient brake-lock occurs. The apparatus includes a control piston positioned in the fluid line interconnecting the master cylinder and the brake cylinder. A force balancing device is connected to the control piston which serves to counteract the force on the control piston applied by the pressurized fluid eminating from the master cylinder. An external control force applying means is also connected to the control piston. When brake-lock or incipient brake-lock is sensed by an appropriate device the external control force applying means is activated, causing movement of the control piston to a position where fluid communication between the master cylinder and the brake cylinder is severed. Hence, additional pressurized fluid from the master cylinder cannot act on the brake cylinder. The pressurized fluid from the brake cylinder remains in communication with the control piston and applies a force on the control piston in the same direction as the external control force thereby reducing the amount of external control force necessary to act on the control piston. The movement of the control piston expands the volume containing the fluid acting on the brake cylinder thereby reducing the pressure therein. Brake-lock is thus terminated due to the reduction of fluid pressure acting on the brakes. The force balancing device also serves to move the control piston back to its original position after brake-lock has terminated thereby reinstating fluid communication between the master cylinder and the brake cylinder.

Figure 2:
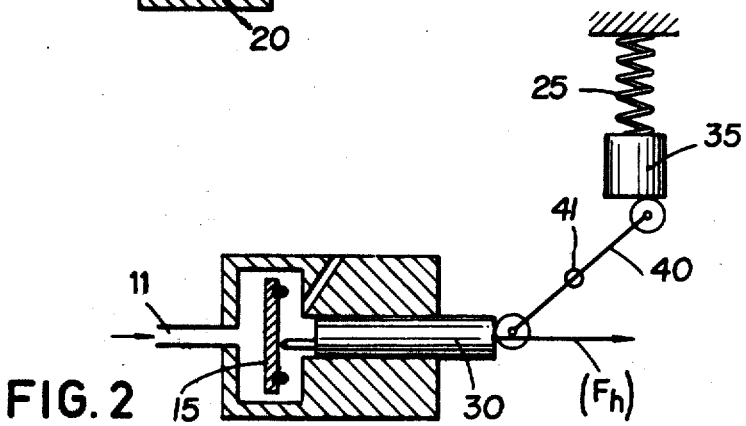
Figure 2A:
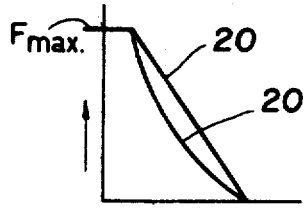
Figure 2B:
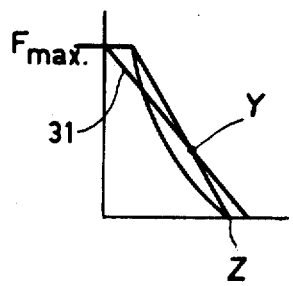
Figure 2C:
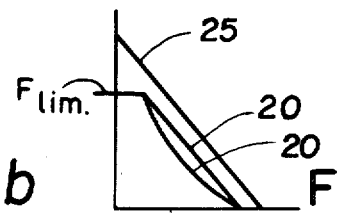
Figure 3:
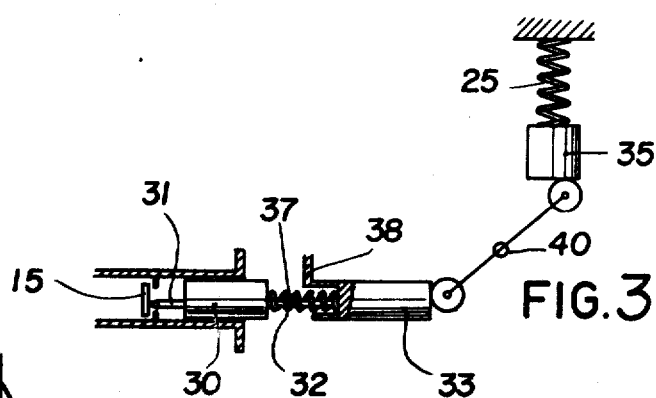
Figure 3A:
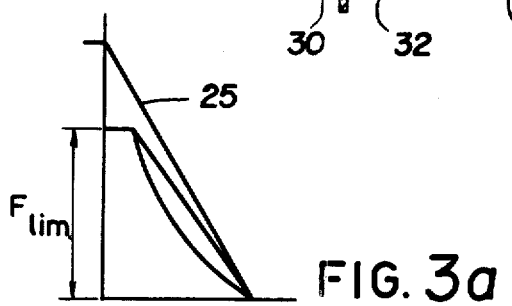
Figure 4:
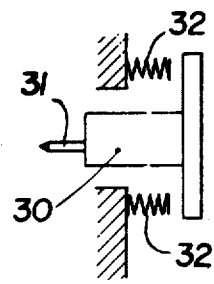
Figure 4A:
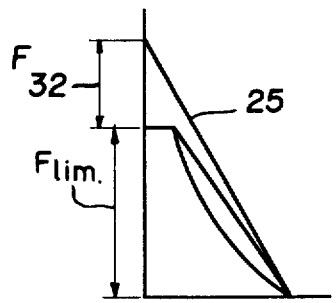
Figure 5:
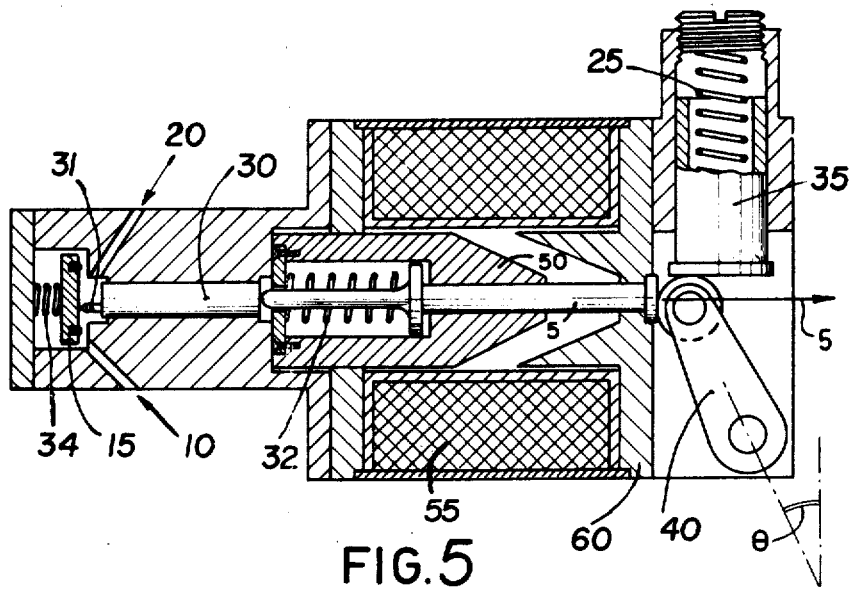
Figure 6A:
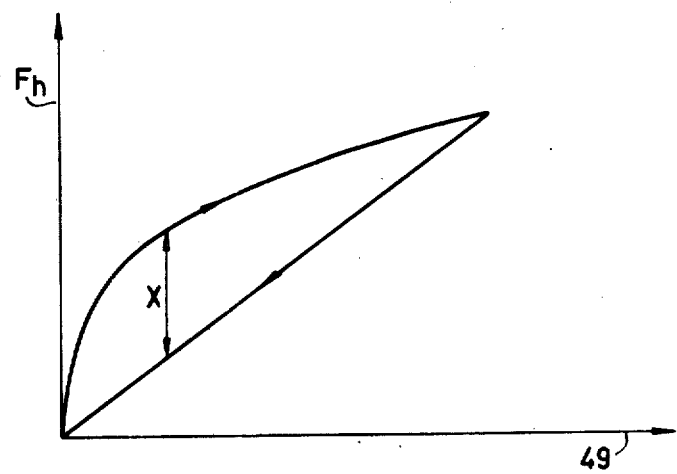
Figure 6B:
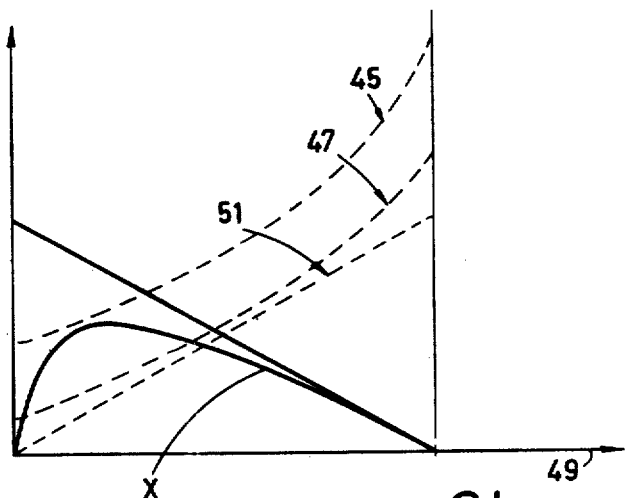

The invention will be described in greater detail with reference to several embodiments thereof illustrated in the accompanying drawings, in which:

FIG. 1 shows an embodiment of the anti-lock apparatus wherein fluid from the master cylinder acts directly on the control piston and on the force balancing device, FIG. 2 shows an embodiment of the apparatus wherein the force balancing device is a spring and link device acting directly on the control piston, FIGS. 2a–2c show graphs concerning the operating characteristics of the embodiment of FIG. 2, FIG. 3 is an alternative embodiment of FIG. 2, FIG. 3a is a graph showing the operating characteristics of the embodiment of FIG. 3, FIG. 4 shows a modification of the apparatus of FIG. 3, FIG. 4a is a graph showing the effects on the operating characteristics of the apparatus when the modification of FIG. 4 is incorporated, FIG. 5 is an embodiment of the invention showing a solenoid and armature for applying an external control force, and FIGS. 6a and 6b are graphs illustrating additional operating characteristics of the invention.

FIG. 1 shows a first embodiment of the invention including an anti-lock control piston 30 actuated by a schematically illustrated control element 5 producing a control force $F_h$.

The element 5 will, in practice, be actuated by an electromagnet (not shown) when the electromagnet is energized in response to suitable signals generated automatically by locking (or imminent locking) and consequent skidding (or imminent skidding) of a related road wheel.

The first energy storage element or source of pressurized fluid is the brake system 20 and the second energy storage element or source of pressurized fluid is the master cylinder and the latter acts on the force-balancing device through a second piston 35. The force-balancing device of FIG. 1 employs a lever 40 pivoted at 41.

The arrangement of FIG. 1 operates as follows:

Valve 15 admits fluid from the master cylinder 10 to the brake cylinder 20 during application of a braking force to the master cylinder 10. The valve 15 remains open as long as the control piston 30 is in the position shown. Piston 30 is maintained in position by the lever or link 40 which includes a roller 42 at each end. The dimensions $a$ and $b$ of the link are chosen so that the torque produced by the force $P_{mc} \times A_{30}$ acting at a radius $a'$ tends to be balanced by the torque $P_{mc} \times A_{35}$ acting at a radius $b'$ ($P_{mc}$=master cylinder pressure, $A_{30}$=area of piston 30, $A_{35}$=area of piston 35). In the anti-lock condition the link 40 will be rotated in the direction shown by the application of an anti-lock control force $F_h$ applied by control element 5. This will allow the valve to close thus terminating fluid communication between the master cylinder 10 and the control piston 30. Further movement in the direction of $F_h$ will reduce the pressure in the brake cylinder 20 since the volume containing the pressurized fluid acting on the brake cylinder 20 will be expanded. At the point where the brake cylinder pressure ($P_w$) has been reduced to zero, the link 40 will be substantially vertical and the system will still be balanced since the piston 30 now has no pressure behind it and the force from piston 35 is primarily acting through pivot point 41. Thus neither piston produces any torque on link 40 and balance is achieved.

In a practical system the link is preferably arranged so that it is slightly out of balance in such manner that the brake will always return to the "on" condition (i.e. the lower end of 40, as shown, is held slightly to the left of a vertical line passing through 41).

The arms of the link can, of course, be cranked at an angle about its pivot 41 and the end rollers can be replaced by connecting rods.

A simplification of the system shown in FIG. 1 is obtained by replacing the fluid drive of the piston 35 by a spring so arranged as to apply the same force as piston 35 would give for a given pressure of the system. Such a spring is the spring 25 shown in the embodiments described hereinafter. Thus the second energy storage element of the definition given above is now the spring instead of the master cylinder. With such an arrangement force-balance will be achieved at only one operating pressure of the system (i.e. the master cylinder pressure) but, as will be seen later, the system is now capable of acting as a pressure limiting system for the brake assembly. It has been found that a solenoid capable of supplying a force to counteract the hysteresis effects due to the brake operating at maximum pressure is also capable of supplying the extra unbalance force due to the spring 25 when the brake pressure is low.

One of the advantages of using a spring in place of the master cylinder drive for piston 35 is that the return of the system to the brake-on condition (after a temporary anti-locking release) is independent of the pressure in the master cylinder which in turn is dependent upon the pressure of the driver's foot upon the brake pedal. Thus, by using a spring the mechanism is made more reliable in its action.

Also, use of this spring 25 in place of the master cylinder connection to piston 35 prevents fluid being fed back to the master cylinder and thus causing a jerk on the driver's foot each time the anti-lock mechanism is operated.

In the arrangement of FIG. 1 the valve 15 and piston 30 cannot act together as a pressure limiter. However, when piston 35 is actuated by a spring, the system is capable of acting as a pressure limiter even without other modifications. Thus, this embodiment serves both as an anti-lock and pressure limiting function.

This will now be explained with reference to FIG. 2 which shows the master cylinder drive to piston 35 replaced by spring 25. Here the force on the piston 30 due to the master cylinder pressure is as shown in FIG. 2 which represents force on piston 30 against distance travelled by piston 30. The force $F_{max}$ due to the pressure of the master cylinder remains applied throughout the period in which the valve 15 is closing. The curve 20—20 represents the hysteresis loop of the brake; that is, the curve representing the brake condition represents the work output from the brake and the line representing the brake-on condition, represents the work input.

Although $F_{max}$ is due to the master cylinder pressure, if the driver raises the master cylinder pressure (e.g. with his foot) above the limiting value, only the limiting pressure will be passed to the brakes ($F_{max}$ then sets the limit to the master cylinder pressure).

This means that, at the limiting pressure, the maximum spring force is inevitably equal to the maximum brake force and the spring cannot overcome the brake force if the latter is greater than the spring force at any point. For example, when the pressure is at $F_{max}$ thereby closing valve 15 and when the brakes have been taken off to the point Z, FIG. 2b, spring 25 cannot re-apply the brakes beyond point Y.

What is required in these circumstances is for the force of the spring to be always larger than the brake force and the situation may be as represented in FIG. 2c where 20—20 is the hysteresis loop of the brake and 25 is the spring characteristic. In other words pressure limiting should preferably be effected at a pressure lower than the pressure available from spring 25 under normal conditions (i.e. when the anti-lock mechanism is not operating). This condition is met in the situation represented in FIG. 2c whereas, of course, it was not met in FIG. 2b.

Thus, it is seen that the embodiment of FIG. 2 has two modes of operation. The pressure limiting mode and the anti-lock mode. A master cylinder pressure exceeding $F_{max}$ occurs thereby closing the valve 15 and does not preclude the operation of the anti-lock mode. Hence, if the valve 15 is closed by the limiting pressure $F_{max}$ and then anti-lock occurs, the control piston 30 will be moved to the right under the influence of a control force $Fh$ applied at 5 which reduces the brake cylinder pressure at 20 thereby terminating brake-lock. The valve 15 remains closed during this sequence of events. Once brake-lock has terminated and the control force removed, the spring 25 will apply a force to the piston to re-apply the brakes. The graph of FIG. 2c illustrates the desired relationship between the spring 25 and limiting pressure for proper re-application of the brakes.

In order to make it possible for the arrangement of FIG. 2 to provide pressure limiting at a pressure lower than that given by the maximum horizontal component of the force due to spring 25, it is possible to introduce an additional spring between the control piston 30 and an actuating or positioning element 33. An example of this is shown schematically in FIG. 3 where the additional spring is indicated at 32 between 30 and an element 33.

In this ararngement the element 33 acts as a positioning element for the piston 30 under the control of the anti-lock force $F_h$. In the condition shown, force $F_h$ is absent and therefore element 33 rests against a fixed stop member 38. At the same time valve 15 is held open by the push rod 31. Between 30 and 33 there is also a spacer rod 37 which is slightly shorter than the distance between piston 30 and element 33 if valve 15 is closed without moving 33.

The actual pressure limiting operation occurs as follows. If it is supposed that element 33 is clamped in a fixed position, for example, by spring 25 being preloaded, then the system acts as a normal pressure limiter because as soon as force $P_{mc} \times A_{30}$ compresses spring 32, the valve 15 closes. Further pressure from the master cylinder does not reach the brake chamber 20. Hence the application of a control force will bias spring 25 only. However, spring 25 has to be stiff in this case. A better solution is shown in FIG. 4 where springs 32 subtract from the force of spring 25 during closure of valve 15.

In FIG. 5 a more detailed example is shown which includes the features of FIG. 4. FIG. 4 illustrates the operation of the arrangement of FIG. 5 as well as that of FIG. 4 provided that force $F_{32}$ is regarded as including the precompression force not only of spring 32 but also of a spring 34 which is added in FIG. 5 to bias the valve 15. The spring 32 of FIG. 5 is designed so as to fulfill also an additional function which will be described hereinafter.

In FIG. 5 the arrangement acts as a pressure limiter because the value 15 closes as soon as force $P_{mc} \times A_{30}$ equals the force of spring 25 times the tangent of the angle of link 40 minus the precompression forces $F_{32}$.

In the embodiment as shown in FIG. 5, the link 40 is reduced from a lever having a central fulcrum 41 and two arms $a-b$ to a link having its fulcrum at one end and only one arm.

In FIG. 5 the springs 32 and 34 have the desired effect of reducing the limiting pressure which would be due to spring 25 alone by a fixed amount corresponding to the initial precompression forces. Then the situation is as represented in FIG. 4. This shows that the system provides pressure limitation at a force level $F_{lim}$ which is determined by springs 32, 34 and 25 and linkage 40, the precompression forces of 32 and 34 being shown as a total force $F_{32}$ subtracted from the maximum force of spring 25. The limiting force $F_{lim}$ is thus equal to $F_{25} \tan O - F_{32}$.

Anti-lock operation of the embodiment of FIG. 5 is as follows:

When brake-lock is sensed the solenoid 55 is actuated which attracts the armature 50 to the plate 60. Movement of the armature 50 towards plate 60 will move rod 5 in the same direction thereby pivoting lever 40 and compressing spring 25. The spring 32 acts as the force transmitting element between the armature 50 and the rod 5. Control piston 30 will also be free to move under the influence of master cylinder pressure. Movement of the control piston to the right as shown in the drawing will allow valve 15 to close, thus severing fluid communication between the master cylinder 10 and both the control piston 30 and brake cylinder 20. Continued movement of the control piston 30 after the closing of the valve 15 will reduce the fluid pressure in the brake cylinder thereby terminating brake-lock. It should be noted that this embodiment also has the pressure limiting mode of operation previously described.

The second function of spring 32 will now be described. FIG. 6a shows a hysteresis loop where X is the force difference due to brake hysteresis at any point. If the force-balance mechanism is set so that the brakes will always turn on when no external activating force is applied, i.e. operation during the pressure limiting mode, then the required external activating force is X as shown in FIG. 6a. Also shown on FIG. 6b are the characteristics of two hypothetical solenoids, one large and one small. The large solenoid is capable of operating the mechanism since at all points on the stroke $dh$ the solenoid force exceeds the required force X. Such a solenoid would be inefficient since over most of its stroke the solenoid exceeds the required force by a considerable amount. An arrangement will now be described that enables a smaller solenoid to be used more efficiently to operate the mechanism.

The characteristics of the small solenoid shown in FIG. 6b are such that the solenoid would not be able to operate the mechanism since force X exceeds the solenoid force for part of the stroke. A spring is now mounted between the solenoid armature and the linkage so that when the solenoid moves the armature, the force in the spring builds up until it can overcome the peak value of X. Once over this peak, the solenoid armature will be able to completely close and the spring will expand to its original length, taking the mechanism through the final part of its stroke. The optimum stiffness of spring can be determined from FIG. 6b which shows the characteristics of a spring which the solenoid is just capable of compressing fully if the linkage is restrained from moving.

The above cited embodiments are intended as exemplary only, and while I have described my invention with a specific application and embodiment thereof, other modifications will be apparent to those skilled in the art without departing from the spirit and scope of the invention.

What is claimed is:

1. A brake release apparatus for a vehicle braking system comprising: a master cylinder for pressurizing a fluid; a brake cylinder; a fluid passage interconnecting said master cylinder and said brake cylinder, means for regulating fluid communication between said master cylinder and said brake cylinder comprising a valve interposed between said master cylinder and said brake cylinder for severing fluid communication therebetween, and a movable control piston coupled to said valve, said control piston having one face in continuous fluid communication with said brake cylinder and in fluid communication with said master cylinder when said valve is open; force balancing means coupled to said control piston by a pivotal lever for counteracting the forces applied to said control piston by pressurized fluid from said master cylinder and said brake cylinder; and means for applying an external control force in opposition to said force balancing means during brake release.

2. A brake release apparatus for a vehicle braking system according to claim 1 wherein said force balancing means comprises a balancing piston interconnected to said master cylinder by said fluid passage and a pivotal lever, one end of said lever coupled to said control piston and the other end of said lever coupled to said balance piston.

3. A brake release apparatus for a vehicle braking system according to claim 2 wherein said balance piston has a larger cross-sectional area subject to pressurized fluid than said control piston.

4. A brake release apparatus for a vehicle braking system according to claim 1 wherein said force-balancing means comprises a first biasing means coupled to said control piston to oppose the fluid pressure forces acting on said control piston.

5. A brake release apparatus for a vehicle braking system according to claim 4 wherein said force-balancing means further comprises a pivotal lever having one end coupled with said control piston and the other end coupled with said biasing means.

6. A brake release apparatus for a vehicle braking system according to claim 5 wherein said force-balancing means further comprises a second biasing means coupled to said control piston, with said biasing force opposing the biasing force of said first biasing means.

7. A brake release apparatus for a vehicle braking system comprising: a housing having a cavity therein, a first fluid passage intersecting said cavity and adapted to be connected to a master cylinder, and a second fluid passage intersecting said cavity and normally interconnected with said first passage, said second passage adapted to be interconnected to a brake cylinder; a valve located in said cavity for severing said connection between said first and second fluid passages, a movable control piston coupled to said valves, said control piston having one face in continuous fluid communication with said second fluid passage and in fluid communication with said first passage when said first and second passages are interconnected; force-balancing means for opposing the pressure forces developed on said control piston by the fluid from said first and second fluid passages, said force-balancing means comprising a first biasing means coupled to said control piston by a pivoted lever; and means for applying an external control force in opposition to the biasing force developed by said first biasing means during brake release for closing of said valve and releasing said control piston for movement, said movement of the control piston expanding the volume containing the fluid acting on said brake cylinder thereby reducing the pressure of said fluid.

8. A brake release apparatus according to claim 7 wherein said force-balancing means further comprises a pivotal lever coupled to said control piston, and said first biasing means comprises a first spring biasing said lever in opposition to said fluid pressure forces acting on said control piston.

9. A brake release apparatus according to claim 8 wherein said means for applying an external control force comprises a solenoid, a movable armature cooperating with said solenoid and a rod movably connected to said armature, said rod interconnecting said control piston and said pivotal lever, wherein movement of said rod by actuation of said solenoid pivots said lever thereby reducing the biasing effect applied to said control piston by said first spring.

10. A brake release apparatus according to claim 9 further comprising a second spring connected to said valve opposing the biasing effect of said first spring.

11. A brake release apparatus according to claim 10 wherein: said armature has a bore passing therethrough; said rod is located in said bore and relatively movable with respect to said armature; one end of said rod engages the face of said control piston and the other end engages said pivotal lever and a third spring engages said armature and said rod for biasing said rod towards engagement with said lever.

References Cited

UNITED STATES PATENTS

| | | | |
|---|---|---|---|
| 2,868,338 | 1/1959 | Lucien et al. | 188—181 |
| 2,963,328 | 12/1960 | Lucien | 188—181 X |
| 2,726,739 | 12/1955 | Jeanson | 188—181 |
| 3,231,315 | 1/1966 | Turnbull | 303—21 X |
| 3,389,939 | 6/1968 | Skoyles | 303—21 |

DUANE A. REGER, Primary Examiner

U.S. Cl. X.R.

188—181